(12) United States Patent
Knapp (10) Patent No.: US 8,886,047 B2
(45) Date of Patent: Nov. 11, 2014

(54) OPTICAL COMMUNICATION DEVICE, METHOD AND SYSTEM

(75) Inventor: David J. Knapp, Austin, TX (US)

(73) Assignee: Ketra, Inc., Austin, TX (US)

( * ) Notice: Subject to any disclaimer, the term of this patent is extended or adjusted under 35 U.S.C. 154(b) by 556 days.

(21) Appl. No.: 12/584,143

(22) Filed: Sep. 1, 2009

(65) Prior Publication Data

US 2010/0061734 A1    Mar. 11, 2010

Related U.S. Application Data

(60) Provisional application No. 61/094,595, filed on Sep. 5, 2008.

(51) Int. Cl.
| | | |
|---|---|---|
| H04B 10/00 | (2013.01) | |
| H04B 10/114 | (2013.01) | |
| H04B 10/80 | (2013.01) | |
| H04B 10/04 | (2006.01) | |

(52) U.S. Cl.
CPC .......... H04B 10/1143 (2013.01); H04B 10/807 (2013.01)
USPC ......................................... 398/138; 398/171

(58) Field of Classification Search
CPC ...................................................... H04B 10/43
USPC ................................................ 398/171, 138
See application file for complete search history.

(56) References Cited

U.S. PATENT DOCUMENTS

| | | | |
|---|---|---|---|
| 4,029,976 A | | 6/1977 | Fish et al. |
| 4,402,090 A | | 8/1983 | Gfeller et al. |
| 4,713,841 A | * | 12/1987 | Porter et al. ................. 398/191 |
| 4,809,359 A | | 2/1989 | Dockery |
| 5,018,057 A | | 5/1991 | Biggs et al. |
| 5,093,744 A | * | 3/1992 | Sato et al. ..................... 398/106 |
| 5,103,466 A | * | 4/1992 | Bazes ........................... 375/361 |
| 5,181,015 A | | 1/1993 | Marshall et al. |
| 5,299,046 A | | 3/1994 | Spaeth et al. ................. 359/154 |

(Continued)

FOREIGN PATENT DOCUMENTS

| | | |
|---|---|---|
| CN | 101083866 | 12/2007 |
| CN | 101150904 | 3/2008 |

(Continued)

OTHER PUBLICATIONS

B. Hall et al., "*Jet Engine Control Using Ethernet with a Brain (Postprint)*," Postprint of the 44th AIAA/ASME/SAE/ASEE Joint Propulsion Conference and Exhibition, Jul. 2008, See Section II.G.

(Continued)

*Primary Examiner* — Daniel Dobson
(74) *Attorney, Agent, or Firm* — Kevin L. Daffer; Daffer McDaniel LLP (57) ABSTRACT

Exemplary optical communication devices are described which, in certain embodiments, derive power optically from and communicate optically to a reading device. The communication devices may also receive data from modulated light from the reading device to achieve a bi-directional optical communication link between the self-powered optical communication device and the reading device. In some embodiments, the communication device is powered by ambient light, such as sunlight, captures data from a sensor, and communicates the stored data some time later to a reading device. In some embodiments, the communication device is powered locally and communicates through air, optical fiber, or other medium with another communication device.

24 Claims, 4 Drawing Sheets

(56) References Cited

U.S. PATENT DOCUMENTS

| | | | |
|---|---|---|---|
| 5,317,441 A | 5/1994 | Sidman | |
| 5,541,759 A | 7/1996 | Neff et al. | |
| 5,619,262 A | 4/1997 | Uno | |
| 5,657,145 A | 8/1997 | Smith | |
| 6,016,038 A | 1/2000 | Mueller et al. | 315/291 |
| 6,067,595 A | 5/2000 | Lindenstruth | |
| 6,069,929 A | 5/2000 | Yabe et al. | |
| 6,108,114 A | 8/2000 | Gilliland et al. | |
| 6,150,774 A | 11/2000 | Mueller et al. | 315/291 |
| 6,234,645 B1 | 5/2001 | Börner et al. | 362/231 |
| 6,234,648 B1 | 5/2001 | Börner et al. | 362/235 |
| 6,250,774 B1 | 6/2001 | Begemann et al. | 362/231 |
| 6,333,605 B1 | 12/2001 | Grouev et al. | |
| 6,384,545 B1 | 5/2002 | Lau | 315/292 |
| 6,396,815 B1 | 5/2002 | Greaves et al. | |
| 6,414,661 B1 | 7/2002 | Shen et al. | |
| 6,441,558 B1 | 8/2002 | Muthu et al. | |
| 6,498,440 B2 | 12/2002 | Stam et al. | 315/291 |
| 6,513,949 B1 | 2/2003 | Marshall et al. | |
| 6,617,795 B2 | 9/2003 | Bruning | 315/151 |
| 6,636,003 B2 | 10/2003 | Rahm et al. | 315/179 |
| 6,639,574 B2 | 10/2003 | Scheibe | |
| 6,664,744 B2 | 12/2003 | Dietz | 315/291 |
| 6,692,136 B2 | 2/2004 | Marshall et al. | 362/231 |
| 6,753,661 B2 | 6/2004 | Muthu et al. | |
| 6,788,011 B2 | 9/2004 | Mueller et al. | 315/294 |
| 6,806,659 B1 | 10/2004 | Mueller et al. | 315/295 |
| 6,831,569 B2 | 12/2004 | Wang et al. | 340/825.52 |
| 6,831,626 B2 | 12/2004 | Nakamura et al. | |
| 6,853,150 B2 | 2/2005 | Clauberg et al. | 315/185 |
| 6,879,263 B2 | 4/2005 | Pederson et al. | 340/815.45 |
| 6,969,954 B2 | 11/2005 | Lys | 315/155 |
| 6,975,079 B2 | 12/2005 | Lys et al. | 315/292 |
| 7,014,336 B1 | 3/2006 | Ducharme et al. | 362/231 |
| 7,038,399 B2 | 5/2006 | Lys et al. | 315/291 |
| 7,046,160 B2 | 5/2006 | Pederson et al. | 340/815.45 |
| 7,072,587 B2 | 7/2006 | Dietz et al. | 398/138 |
| 7,088,031 B2 | 8/2006 | Brantner et al. | |
| 7,135,824 B2 | 11/2006 | Lys et al. | 315/292 |
| 7,161,311 B2 | 1/2007 | Mueller et al. | 315/294 |
| 7,166,966 B2 | 1/2007 | Naugler, Jr. et al. | |
| 7,233,115 B2 | 6/2007 | Lys | 315/291 |
| 7,233,831 B2 | 6/2007 | Blackwell | 700/17 |
| 7,252,408 B2 | 8/2007 | Mazzochette et al. | 362/294 |
| 7,255,458 B2 | 8/2007 | Ashdown | 362/246 |
| 7,256,554 B2 | 8/2007 | Lys | 315/291 |
| 7,294,816 B2 | 11/2007 | Ng et al. | |
| 7,315,139 B1 | 1/2008 | Selvan et al. | |
| 7,329,998 B2 | 2/2008 | Jungwirth | |
| 7,330,002 B2 | 2/2008 | Joung | |
| 7,358,706 B2 | 4/2008 | Lys | 323/222 |
| 7,359,640 B2 | 4/2008 | Onde et al. | |
| 7,362,320 B2 | 4/2008 | Payne et al. | |
| 7,372,859 B2 | 5/2008 | Hall et al. | 370/400 |
| 7,400,310 B2 | 7/2008 | LeMay | |
| 7,445,340 B2 | 11/2008 | Conner et al. | |
| 7,511,695 B2 | 3/2009 | Furukawa et al. | |
| 7,525,611 B2 | 4/2009 | Zagar et al. | |
| 7,554,514 B2 | 6/2009 | Nozawa | |
| 7,573,210 B2 | 8/2009 | Ashdown et al. | |
| 7,583,901 B2 | 9/2009 | Nakagawa et al. | |
| 7,606,451 B2 | 10/2009 | Morita | 385/24 |
| 7,607,798 B2 | 10/2009 | Panotopoulos | |
| 7,649,527 B2 | 1/2010 | Cho et al. | |
| 7,659,672 B2 | 2/2010 | Yang | |
| 7,683,864 B2 | 3/2010 | Lee et al. | |
| 7,737,936 B2 | 6/2010 | Daly | |
| 8,013,538 B2 | 9/2011 | Zampini et al. | |
| 8,018,135 B2 | 9/2011 | Van De Ven et al. | |
| 8,040,299 B2 | 10/2011 | Kretz et al. | |
| 8,044,899 B2 | 10/2011 | Ng et al. | |
| 8,044,918 B2 | 10/2011 | Choi | |
| 8,076,869 B2 | 12/2011 | Shatford et al. | |
| 8,159,150 B2 | 4/2012 | Ashdown et al. | |
| 8,174,205 B2 | 5/2012 | Myers et al. | |
| 8,283,876 B2 | 10/2012 | Ji | |
| 2001/0020123 A1 | 9/2001 | Diab et al. | |
| 2001/0030668 A1 | 10/2001 | Erten et al. | |
| 2002/0014643 A1 | 2/2002 | Kubo et al. | |
| 2002/0049933 A1 | 4/2002 | Nyu | |
| 2003/0122749 A1 | 7/2003 | Booth, Jr. et al. | 345/82 |
| 2004/0052076 A1 | 3/2004 | Mueller et al. | 362/293 |
| 2004/0052299 A1 | 3/2004 | Jay et al. | |
| 2004/0136682 A1 | 7/2004 | Watanabe | |
| 2004/0201793 A1 | 10/2004 | Anandan et al. | |
| 2005/0004727 A1 | 1/2005 | Remboski et al. | 701/36 |
| 2005/0030203 A1 | 2/2005 | Sharp et al. | |
| 2005/0030267 A1 | 2/2005 | Tanghe et al. | |
| 2005/0053378 A1 | 3/2005 | Stanchfield et al. | |
| 2005/0110777 A1 | 5/2005 | Geaghan et al. | 345/179 |
| 2005/0169643 A1 | 8/2005 | Franklin | |
| 2005/0200292 A1 | 9/2005 | Naugler, Jr. et al. | 315/149 |
| 2005/0242742 A1 | 11/2005 | Cheang et al. | |
| 2005/0265731 A1 | 12/2005 | Keum et al. | |
| 2006/0145887 A1 | 7/2006 | McMahon | |
| 2006/0164291 A1 | 7/2006 | Gunnarsson | 342/51 |
| 2006/0198463 A1* | 9/2006 | Godin | 375/295 |
| 2006/0220990 A1 | 10/2006 | Coushaine et al. | |
| 2006/0227085 A1 | 10/2006 | Boldt, Jr. et al. | 345/83 |
| 2007/0040512 A1 | 2/2007 | Jungwirth et al. | |
| 2007/0109239 A1 | 5/2007 | den Boer et al. | |
| 2007/0132592 A1 | 6/2007 | Stewart et al. | 340/572.8 |
| 2007/0139957 A1 | 6/2007 | Haim et al. | 362/600 |
| 2007/0248180 A1* | 10/2007 | Bowman et al. | 375/272 |
| 2007/0254694 A1 | 11/2007 | Nakagwa et al. | |
| 2007/0279346 A1 | 12/2007 | den Boer et al. | |
| 2008/0107029 A1 | 5/2008 | Hall et al. | |
| 2008/0136770 A1 | 6/2008 | Peker et al. | |
| 2008/0136771 A1 | 6/2008 | Chen et al. | |
| 2008/0150864 A1 | 6/2008 | Bergquist | |
| 2008/0186898 A1* | 8/2008 | Petite | 370/315 |
| 2008/0222367 A1 | 9/2008 | Co | |
| 2008/0235418 A1* | 9/2008 | Werthen et al. | 710/106 |
| 2008/0253766 A1 | 10/2008 | Yu et al. | |
| 2008/0265799 A1 | 10/2008 | Sibert | 315/292 |
| 2008/0297070 A1 | 12/2008 | Kuenzler et al. | 315/308 |
| 2008/0304833 A1 | 12/2008 | Zheng | |
| 2008/0309255 A1 | 12/2008 | Myers et al. | 315/297 |
| 2009/0026978 A1 | 1/2009 | Robinson | |
| 2009/0040154 A1 | 2/2009 | Scheibe | |
| 2009/0049295 A1 | 2/2009 | Erickson et al. | |
| 2009/0171571 A1 | 7/2009 | Son et al. | |
| 2009/0196282 A1 | 8/2009 | Fellman et al. | |
| 2009/0245101 A1 | 10/2009 | Kwon et al. | |
| 2009/0284511 A1 | 11/2009 | Takasugi et al. | |
| 2010/0005533 A1* | 1/2010 | Shamir | 726/36 |
| 2010/0061734 A1 | 3/2010 | Knapp | 398/128 |
| 2010/0096447 A1* | 4/2010 | Kwon et al. | 235/375 |
| 2010/0134021 A1 | 6/2010 | Ayres | |
| 2010/0182294 A1 | 7/2010 | Roshan et al. | |
| 2010/0188972 A1 | 7/2010 | Knapp | 370/226 |
| 2010/0194299 A1 | 8/2010 | Ye et al. | |
| 2010/0272437 A1 | 10/2010 | Yoon et al. | |
| 2010/0327764 A1 | 12/2010 | Knapp | 315/250 |
| 2011/0031894 A1 | 2/2011 | Van De Ven | |
| 2011/0044343 A1 | 2/2011 | Sethuram et al. | |
| 2011/0052214 A1 | 3/2011 | Shimada et al. | |
| 2011/0062874 A1 | 3/2011 | Knapp | |
| 2011/0063214 A1 | 3/2011 | Knapp | 345/158 |
| 2011/0063268 A1 | 3/2011 | Knapp | 345/207 |
| 2011/0068699 A1 | 3/2011 | Knapp | 315/158 |
| 2011/0069094 A1 | 3/2011 | Knapp | 345/690 |
| 2011/0069960 A1 | 3/2011 | Knapp | 389/103 |
| 2011/0133654 A1 | 6/2011 | McKenzie et al. | |
| 2011/0148315 A1 | 6/2011 | Van Der Veen et al. | |
| 2011/0248640 A1 | 10/2011 | Welten | |
| 2011/0253915 A1 | 10/2011 | Knapp | |
| 2011/0299854 A1 | 12/2011 | Jonsson et al. | |
| 2011/0309754 A1 | 12/2011 | Ashdown et al. | |
| 2012/0229032 A1 | 9/2012 | Van De Ven et al. | |
| 2012/0306370 A1 | 12/2012 | Van De Ven et al. | |
| 2013/0016978 A1 | 1/2013 | Son et al. | |

(56) References Cited

U.S. PATENT DOCUMENTS

FOREIGN PATENT DOCUMENTS

| CN | 101458067 | 6/2009 | | |
|---|---|---|---|---|
| EP | 0196347 | 10/1986 | | |
| EP | 0456462 | 11/1991 | | |
| GB | 2307577 | 5/1997 | | |
| JP | 06-302384 | 10/1994 | ............ | H05B 37/02 |
| JP | 08-201472 | 8/1996 | | |
| JP | 11-025822 | 1/1999 | ............ | H01H 35/00 |
| JP | 2001-514432 | 9/2001 | ............ | H05B 37/02 |
| JP | 2007-266974 | 10/2007 | ............ | G06K 17/00 |
| WO | 2010/124315 | 11/2010 | | |

OTHER PUBLICATIONS

A. Kebemou, "*A Partitioning-Centric Approach for the Modeling and the Methodical Design of Automotive Embedded System Architectures*," Dissertation of Technical University of Berlin, 2008, See Section 2.2.3.
D. O'Brien et al., "*Visible Light Communications and Other Developments in Optical Wireless*," Wireless World Research Forum, 2006.
J. Zalewski et al., "*Safely Issues in Avionics and Automotive Databuses*," IFAC World Congress, Jul. 4, 2005.
Project IEEE P802.15 Working Group for Wireless Personal Area Networks (WPANs), "*Visible Light Communication; Tutorial*," Mar. 9, 2008.
PCT/US2010/000219, "International Search Report," dated Oct. 12, 2010.
PCT/US2010/002171, "International Search Report," dated Nov. 24, 2010.
PCT/US2010/004953, "International Search Report," dated Mar. 22, 2010.
PCT/US2010/001919, "International Search Report," dated Feb. 24, 2011.
U.S. Appl. No. 12/924,628, "*LED Transceiver Front End Circuitry and Related Methods*," filed Sep. 30, 2010.
PCT/US2009/004953, "International Preliminary Report on Patentability and Written Opinion," dated Mar. 8, 2011.
PCT/US2010/000219, "Written Opinion of the International Searching Authority," dated Oct. 12, 2010.
PCT/US2010/001919, "Written Opinion of the International Searching Authority," dated Feb. 24, 2011.
PCT/US2010/002171, "Written Opinion of the International Searching Authority," dated Nov. 24, 2010.
Notice of Allowance mailed Jan. 28, 2014 for U.S. Appl. No. 13/178,686.
Notice of Allowance mailed Feb. 21, 2014 for U.S. Appl. No. 12/806,118.
Final Office Action mailed Jul. 9, 2013 for U.S. Appl. No. 12/806,118.
Johnson, "Visibile Light Communications," CTC Tech Brief, Nov. 2009, 2 pages.
Chonko, "Use Forward Voltage Drop to Measure Junction Temperature," © 2013 Penton Media, Inc., 5 pages.
Office Action mailed Oct. 24, 2013 for U.S. Appl. No. 12/806,117.
Notice of Allowance mailed Oct. 31, 2013 for U.S. Appl. No. 12/924,628.
Office Action mailed Nov. 12, 2013 for U.S. Appl. No. 13/231,077.
Office Action mailed Jun. 10, 2013 for U.S. Appl. No. 12/924,628.
Final Office Action mailed Jun. 14, 2013 for U.S. Appl. No. 12/806,117.
Office Action mailed Jun. 27, 2013 for U.S. Appl. No. 13/178,686.
Office Action mailed Dec. 4, 2013 for U.S. Appl. No. 12/803,805.
Office Action mailed Nov. 4, 2013 for CN Application No. 201080032373.7.
International Search Report & Written Opinion, PCT/US2013/027157, May 16, 2013.
Office Action mailed Jun. 23, 2014 for U.S. Appl. No. 12/806,117.
Office Action mailed Apr. 22, 2014 for U.S. Appl. No. 12/806,114.
Final Office Action mailed Jun. 18, 2014 for U.S. Appl. No. 13/231,077.
Office Action mailed May 12, 2011 for U.S. Appl. No. 12/360,467.
Final Office Action mailed Nov. 28, 2011 for U.S. Appl. No. 12/360,467.
Notice of Allowance mailed Jan. 20.2012 for U.S. Appl. No. 12/360,467.
Office Action Mailed Aug. 2, 2012 for U.S. Appl. No. 12/806,114.
Office Action Mailed Oct. 2, 2012 for U.S. Appl. No. 12/806,117.
Office Action Mailed Jul. 11, 2012 for U.S. Appl. No. 12/806,121.
Final Office Action Mailed Oct. 11, 2012 for U.S. Appl. No. 12/806,121.
Office Action mailed Dec. 17, 2012 for U.S. Appl. No. 12/806,118.
Office Action mailed Oct. 9, 2012 for U.S. Appl. No. 12/806,126.
Office Action mailed Jul. 10, 2012 for U.S. Appl. No. 12/806,113.
Notice of Allowance mailed Oct. 15, 2012 for U.S. Appl. No. 12/806,113.
International Search Report & Written Opinion mailed Sep. 19, 2012 for PCT/US2012/045392.
Partial International Search Report mailed Nov. 16, 2012 for PCT/US2012/052774.
International Search Report & Written Opinion for PCT/US2012/052774 mailed Feb. 4, 2013.
Notice of Allowance mailed Feb. 4, 2013 for U.S. Appl. No. 12/809,113.
Notice of Allowance mailed Feb. 25, 2013 for U.S. Appl. No. 12/806,121.
Notice of Allowance mailed May 3, 2013 for U.S. Appl. No. 12/806,126.
Office Action mailed Sep. 10, 2014 for U.S. Appl. No. 12/803,805.

\* cited by examiner

OPTICAL COMMUNICATION DEVICE, METHOD AND SYSTEM

RELATED APPLICATIONS

This application claims priority to the following co-pending provisional application: Provisional Application Ser. No. 61/094,595 entitled "OPTICAL COMMUNICATION DEVICE, METHOD AND SYSTEM," which was filed on Sep. 5, 2008.

TECHNICAL FIELD OF THE INVENTION

This invention relates to optical communication devices and, more particularly, to self-powered identification and/or data tags.

BACKGROUND

Optical communication devices are used in a variety of applications including, but certainly not limited to self powered identification and data tags, infrared wireless and fiber optic transceivers, and solar powered sensors. Optical identification and data tags have certain advantages over Radio Frequency Identification (RFID) and data tags. Solar powered sensors are currently large and expensive, which limits their application.

Self powered radio frequency identification (RFID) tags have been used for years for identifying items with a unique identification number that can be read electronically with a special powered reading device. The penetration into the marketplace is growing but has been limited by the cost of the tag, which includes an antennae that is necessary for RF communication.

The Hitachi Mu-Chip is an example state of the art RFID device. Although the device measures only 2.5 mm×1.5 mm, it requires the antennae, which measures 54 mm×1.5 mm. Additionally the chip must be mounted and connected to the antennae, which increases cost and reduces reliability. Other well known limitations of RFID tags include disturbances due to metal, water, and electromagnetic interference (EMI), and cross talk between tags. In harsh environments and along conveyor belts, for instance, with closely spaced tagged items, RFID tags can be unreliable.

To work in harsh environments, a Swedish company, Scirocco AB, has developed Infrared Identification (IRID) tags, which contain an energy converter block to power the tag from infrared or visible light, and an infrared transmitter block which sends the contents of the ID register when the tag is powered. The Scirocco data tags additionally provide some memory and an infrared detector block to enable data tags to receive and store data in non-volatile memory. Additional information on the Scirocco tags and system are described in U.S. Published Patent Application No. US 2006/0164291.

The Scirocco system provides an identification solution that overcomes certain limitations of RFID systems with respect to metal shielding, water, EMI, and interference, which is appropriate for relatively low volume target applications. For very high volume applications, such as consumer package tracking, smart cards, keyless entry, retail inventory identification, etc. the cost may be prohibitive. The Scirocco identification tags have separate power supply (energizer) and infrared transmitter circuits, and the data tags additionally contain separate infrared detector circuits, which increase component count and cost.

The energizer circuitry contains an array of silicon diodes with at least two sets of diodes connected in series to produce sufficient voltage and current to power the tag. The transmitter contains an infrared LED and some driver circuitry. The infrared detector circuitry contains a reverse biased silicon photodiode connected to an amplifier circuit. All this circuitry increases the total cost of components in the tags and increases the power consumption, which further increases the cost and/or reduces communication distance.

The most common protocol for infrared wireless communication is Infrared Data Association (IRDA), which was developed in the early 1990's for communication between a computer and its peripherals. The Vishay TFDU4101 IRDA transceiver implements the physical layer of this protocol stack. The TFDU4101 package is called a "Babyface" since it has two separate transparent domes for transmitting and receiving infrared light. Under one dome is an LED for transmitting and under the other dome is a silicon photodiode for receiving. The associated LED driver and photodiode receiver circuitry is implemented in one or two silicon chips.

An increasingly popular protocol for optical networking in automobiles is called Media Oriented System Transport (MOST), which was introduced in the late 1990's to enable multimedia components in a car to communicate. One of the physical layers for MOST is a ring of unidirectional point-to-point optical links using plastic optical fiber (POF). Each optical link has a fiber optic transmitting module at one end of the POF and a fiber optic receiving module at the other end.

One supplier of opto-electrical converters useful for MOST is Avago. Their optical transmitter contains an LED and a driver IC, while the receiver contains a photodiode and receiver IC. Data flows in one direction through the optical link from one node to the next. Bi-directional communication is essentially accomplished by connecting all devices in a uni-directional ring topology, which works fine unless one link or one node is not functioning properly. If one device or one link goes down, bi-directional communication is not possible.

Sensing of signals such as temperature, pressure, strain, acceleration, moisture, etc is commonly needed in locations that are costly to power and communicate with using wires. Consequently, remote sensors are available that include batteries and some form of wireless communication. The NPX1 tire pressure sensor from GE includes a Lithium Ion battery and a UHF transmitter that enables the module to reside inside a rotating tire.

In some cases, the sensors include solar cells that recharge the battery from sunlight or ambient light, such as certain strain gauge devices available from MicroStrain. Such devices may be placed, for example, at critical locations on a bridge to monitor strain on the bridge, and to communicate data to a reading device through a wireless RF link. Such sensor devices are frequently very large and expensive.

There exists a need to overcome problems existing in prior solutions and to provide a more efficient and cost effective solution for optical communications and identification devices.

SUMMARY OF THE INVENTION

Optical communication devices, systems and methods are disclosed. In some embodiments, a single optical device is used to transmit and receive data. Further, in other embodiments, a single optical device is used to power a device in addition to providing for communications to external devices.

Embodiments disclosed herein relate to communication devices that are powered by and communicate with light, and more specifically to such communication devices using a single optical device for data transmission and for providing power, and even more specifically to optical communication devices that use a light emitting diode (LED) for both transmitting and receiving data and for providing power to the device, such as a self-powered infrared identification and/or data tag.

The problems such as, but not limited to, those described above with prior solutions are in large part solved by the communication devices described herein. Exemplary devices include an LED and a controller integrated circuit. The form and function of the controller IC depends on the particular application and the requirements. Likewise, the LED can power the controller from incident light, optically transmit data from the controller, and convert received optical data to electrical signals for the controller depending on the application and requirements.

In certain embodiments, the communication device derives power optically from and communicates optically to a reading device. In some embodiments, the communication device additionally receives data from modulated light from the reading device which produces a bi-directional optical communication link between the self-powered optical communication device and the reading device. In some embodiments, the communication device is powered by ambient light, such as sunlight, captures data from a sensor, and communicates the stored data some time later with a reading device. In some embodiments, the communication device is powered locally and communicates through air or optical fiber with another communication device.

For identification and data tag applications, exemplary communication devices include an LED and a controller IC preferably packaged together in transparent plastic. The LED is preferably mounted directly on top of the controller IC and electrically connected to the controller using bond wires or flip-flip chip technology. The transparent plastic is preferably molded with a single dome centered around the LED to focus light to and from the LED. In other embodiments, the controller IC and the LED can be packaged separately using traditional technology with the appropriate leads electrically connected together.

For identification tags, the controller IC contains at least an identification number in some sort of read only memory (ROM). When the controller is powered by light from a reading device, this identification number is transmitted to the reading device in response. The LED converts incident light from the reader to electricity, which powers the controller. The controller stores some of this power on capacitors for instance, which power the controller when the reader momentarily stops emitting light. In response the controller uses the LED to transmit one or more bits of the identification number to the reader. In order to generate sufficient voltage to produce sufficient light from the LED, the controller may include a voltage boost circuit such as a capacitive voltage doubler.

Optionally, an identification tag can receive commands from the reader in addition to transmitting data to the reader, which can among other things, prevent the tag from inadvertently transmitting. The light from the reader can be modulated between two different optical power levels by the data that forms a command, which is converted to an electrical signal by the LED in the tag and decoded by the controller IC. The electrical signal can be low pass filtered to provide power to the controller and high pass filtered to detect the data.

Data tags are similar to identification tags with an exception that the reader can write to in addition to reading from the tag. Thus, a data tag also receives optical data and commands from the reader. The data tag typically has some sort of non-volatile memory in which the data is stored so that the data is not lost when the device is powered down.

The controller IC for a remote sensor may be similar to an identification or data tag, but with an additional means of measuring a signal. For instance, a device that measures temperature could have an element such as a diode that produces a signal that varies with temperature and an analog-to-digital converter to digitize the signal. The digitized signal could be stored in memory or immediately communicated to a reader.

The LED in the remote sensor could provide power to the controller from sunlight, ambient light, or light from a reader through air or through an optical fiber. Light from a reader could be modulated to communicate commands and data with the sensor or un-modulated to simply power the sensor. The sensor optionally could have a re-chargeable battery attached that is charged when sufficient light is captured by the LED and that powers the device when there is insufficient light.

Network transceiver devices for bi-directional optical communication through air such as IRDA or through fiber such as MOST could use a single LED for both transmitting and receiving optical data at different times. Higher levels of the protocol could determine when data goes in which direction. The controller IC for the transceiver could contain the LED driver and receiver circuitry along with the network interface controller functionality or just the LED driver and receiver circuitry. Typically, such a network transceiver device is powered locally, so incident light typically does not need to power the device, however, self-powered sensors or tags could be attached to a fiber optic network or communicate through air with an IRDA enabled computer for instance.

Packaging for a network transceiver device could be similar to that described for the identification and data tags or could be similar to that currently used for networks such as MOST and IRDA. For IRDA, the transceiver package could be much smaller and with one dome. For MOST, only one transceiver opto-electronic converter module would be needed instead one transmitting and one receiving module. The transceiver package could contain the LED and the controller IC or just the LED with the controller packaged conventionally.

LEDs are traditionally not used in optical receivers since LEDs typically produce less current, but higher voltage, than silicon photodiodes. Additionally, the semiconductor material used to make LEDs (Aluminum Gallium Arsenide for near infrared LEDs) is significantly more expensive per unit area than silicon. Since the self-powered applications described herein utilize an LED for transmitting, using the LED to also produce power and receive data eliminates the need for silicon photodiodes and reduces device cost. Additionally, the higher voltage provided by an LED is helpful to power the controller IC. Alternatively, a stack of series connected silicon photodiodes may be used to effectively power the device, however, they are difficult to integrate. For locally powered network transceivers, using an LED instead of an optimized silicon photodiode for receiving may limit data rate or sensitivity performance, but may substantially reduce cost and improve feature set.

The embodiments disclosed in several aspects are suitable for communication devices, for methods for operating such devices, for methods of making such devices, and for systems incorporating such devices, all as described herein in greater detail and as set forth in the appended claims. The described techniques, structures, and methods may be used alone or in combination with one another.

DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items. While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Optical communication devices, systems and methods are disclosed that utilize a single optical device to transmit and receive data. Further, this single optical device can also be used to power the device in addition to providing for communications to external devices.

Figure 1:
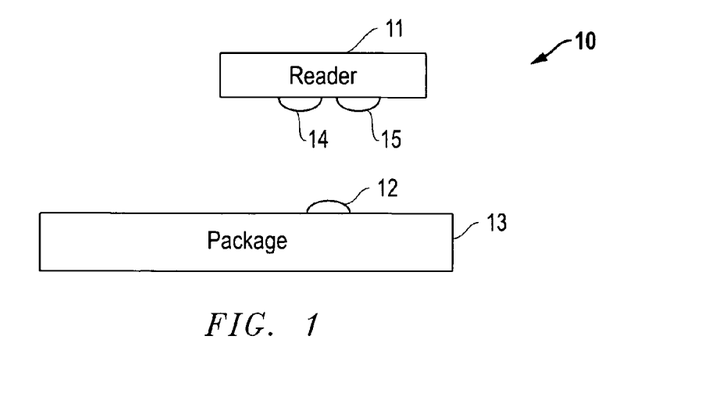
FIG. 1 is a block diagram for an optical identification tag system.

Turning now to the drawings, FIG. 1 illustrates one example of an optical identification tag system 10, which includes a reader 11 and a tag 12 attached to a package 13. It is understood that system 10 can operate with any frequency light including and preferentially near infrared light (e.g., wavelengths of about 0.7 to 1.0 micrometers). The reader 11 includes an optical transmitter 14 and optical receiver 15 that provide power to and communicate with the tag 12. The reader 11 is powered by a battery or an electrical outlet and, if desired, can be optimized to produce a maximum amount of transmitted optical power to the tag 12 and can be optimized to receive a minimum amount of power. This enables the maximum distance between the reader 11 and the package 13. The optical power from transmitter 14 is modulated between two power levels to encode data that is detected by tag 12. The average value of the optical power from transmitter 14 is converted to electrical power that energizes tag 12.

The tag 12 contains non-volatile memory which stores an identification (ID) code and possibly other information that is programmed either during the tag manufacturing process or by the reader 11. The ID code or number programmed into the tag 12 uniquely identifies the package 13 so that the package 13 can be tracked as it is moved from one location to another by a delivery service for instance. The reader 11 reads the ID code from tag 12 and compares it with codes in a database to identify the package. Tag 12 may also include additional non-volatile memory to store a variety of information that the reader 11 could store and retrieve.

In another example of an identification tag system, the reader 11 produces un-modulated light from transmitter 14 that powers the tag 12, and uses an optical receiver 15 to receive data from the tag 12. In such a system, the tag 12 continuously transmits the identification code and potentially other information whenever the tag 12 is powered.

Figure 2A:
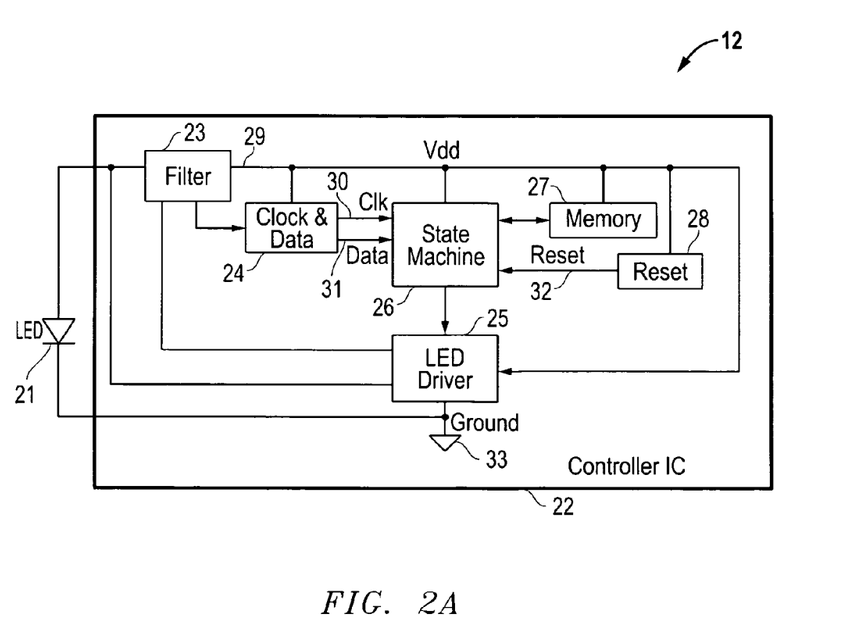
FIG. 2A is a block diagram of a communication device that uses a single LED for transmitting and receiving data, and for powering the device.

FIG. 2A illustrates an exemplary block diagram of the tag 12, which includes LED 21 and controller integrated circuit (IC) 22. The controller IC 22 contains power supply filter 23, clock and data recovery circuitry 24, LED driver 25, state machine 26, non-volatile memory 27, and reset generator 28. The power supply filter 23 low pass filters the voltage induced on the LED when receiving modulated light to produce a relatively constant voltage on supply voltage line 29 which is labeled VDD. The clock and data recovery circuitry 24 is powered by VDD and produces a logic level clock 30 and logic level data 31 from the LED voltage modulated by the received light.

The LED driver 25 produces the relatively high voltage necessary to forward bias the LED 21 to emit light. The data transmitted may be represented by the presence of a light pulse from the LED 21 for a logical one and the absence of a light pulse for a logical zero. Power for the LED 21 may be stored in capacitors in the LED driver 25, which are discharged when a light pulse is generated. The reader 11 preferably transmits light for some period of time before each pulse is transmitted by the tag 12.

The state machine 26 is powered by VDD 29 and clocked by the clock signal (CLK) 30. The state machine 26 accepts data signals (DATA) 31 from the clock and data recovery circuitry 24, which can include commands. The state machine 26 interprets the commands being sent from the reader 11, and produces the necessary control signals to perform the desired action. The basic commands include reading and writing the non-volatile memory 27. The non-volatile memory 27 could be read only memory (ROM) programmed during the manufacturing of the tag 12, in which case, a write command would not be used. The non-volatile memory 27 could be one time programmable (OTP) or many times programmable memory that is programmed by the user, in which case, read and write commands are used. The memory is preferably non-volatile so that information is not lost when the tag 12 is not illuminated and consequently not powered.

The reset generator 28 monitors the voltage of VDD 29 and produces a reset signal (RESET) 32 to the state machine 26 when the supply voltage is below a critical level. The critical level depends on the technology in which the controller IC 22 is fabricated, but ensures that the power supply voltage for the state machine 26 is sufficient for reliable operation.

FIG. 2A provides just one example of an identification or data tag block diagram. In some cases, such as tags that only transmit data, functions such as clock and data recovery are not necessary, and the requirements on functions such as the power supply filter are greatly reduced. In other cases, functions such as the reset generator can be eliminated provided the state machine does not require a reset. Depending on the application, the requirements on the state machine can vary widely as well. The LED driver circuitry and the form of the transmitted data can also vary widely.

Figures 2B, 3:
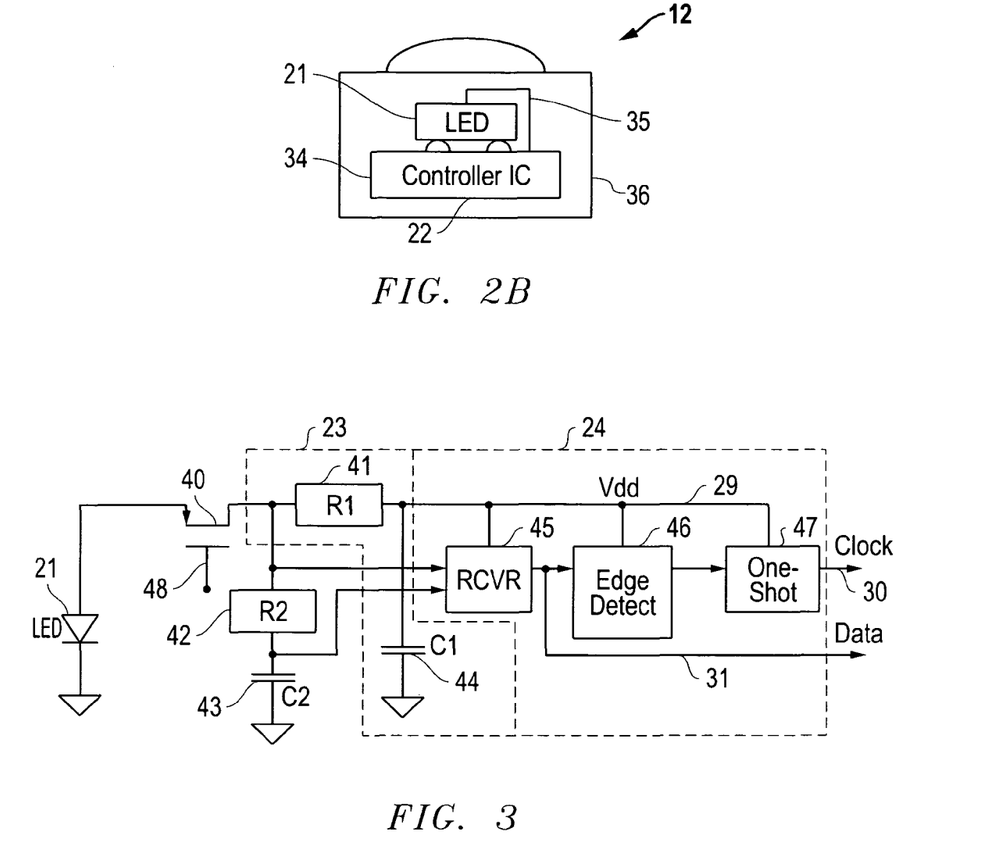
FIG. 2B is a mechanical drawing of a communication device that uses a single LED for transmitting and receiving data, and for powering the device.
FIG. 3 is a block diagram of exemplary power supply and clock and data recovery circuitry.

FIG. 2B illustrates an example of the mechanical packaging for the tag 12. LED 21 is mounted on top of controller IC 22 which provides mechanical stability and produces an electrical connection from the LED cathode to the controller IC 22 ground signal 33. The ground connection is made with commonly known flip-chip bonding technology which attaches solder bumps 34 on the controller IC 22 to the backside LED 21 contact. The LED 21 anode is connected to the controller IC 22 through bond wire 35. The connected LED 21 and controller IC 22 are encapsulated in a transparent plastic package 36 with a dome over the LED region for focusing incident and emitted light.

In another example package, if an LED with both anode and cathode contacts on the surface is used, bond wire 35 can be eliminated by connecting both terminals with flip chip technology. In other examples, the LED 21 and controller IC 22 can be packaged separately in conventional LED and semiconductor packaging technology or unconventional packaging technology. The example in FIG. 2B is one of many packaging possibilities.

FIG. 3 is a block diagram of an exemplary power supply filter 23 and clock and data recovery circuit 24. Switch 40 is a p-channel type gate that connects VDD 29 to the LED 21 anode when data is being input to the tag 12. When receiving data, the enable signal 48 is low, which connects the LED 21 anode to resistor (R1) 41. Resistor (R1) 41 in combination with capacitor (C1) 44 form the power supply filter 23 and produce VDD 29. Example values for resistor (R1) 41 and capacitor (C1) 44 are 100 k ohms and 1 nF respectively, which produces a 1.6 kHz cutoff frequency. Assuming controller IC 22 draws less than 1 uA of current from VDD 29, the voltage drop across resistor (R1) 41 is less than 100 mV. Typical values for VDD 29 range from 0.5 to 1.0 volts. As illustrated below in FIGS. 5A and 5B, a capacitor in the LED driver 25 can be switched in parallel to capacitor (C1) 44 to reduce the bandwidth of the power supply filter 23.

Typical values for LED parasitic effective capacitance range from 10-100 pF, which in combination with resistor (R1) 41 limits the maximum data rate from reader 11 to tag 12. Assuming the data rate is substantially higher than the power supply cutoff frequency (1.6 kHz from above), VDD 29 is effectively a DC voltage. The average voltage across resistor (R1) 41 is equal to the average current consumption from VDD 29 times the resistance of resistor (R1) 41. The average voltage on the LED 21 anode equals the voltage on VDD 29 plus the average voltage across resistor (R1) 41. Assuming the received modulated light has a large extinction ratio and the data encoding scheme is DC free, the average current is produced by twice the average current, for half the time. This results in the instantaneous voltage across resistor (R1) 41 varying between roughly zero volts and twice the average voltage as the received data changes states. The small signal model of this circuit to determine the bandwidth at the LED 21 anode is a current source into the parallel combination of resistor (R1) 41 and the parasitic capacitance. Over the 10-100 pF range, the bandwidth varies from about 160 kHz to 16 kHz with resistor (R1) 41 equal to 100 k ohms. Such bandwidths would limit data rates to roughly 30-300 k bits per second.

To emit light from the LED 21, the anode voltage is raised to roughly twice VDD 29. During this time, the enable signal 48 is also set to roughly twice VDD, which turns switch 40 off and disconnects the power supply circuit from the LED 21 anode. When switch 40 is off, the current drawn from VDD 29 is provided by capacitor (C1) 44. With a capacitance of 1 nF and 1 uA current draw, the voltage across capacitor (C1) 44 will only drop 10 mV in 10 usec, which is more than sufficient time to transmit one bit.

The average voltage of the LED 21 anode side of resistor (C1) 41 is produced by the low pass filter combination of resistor (R2) 42 and capacitor (C2) 43. This average voltage is compared by receiver (RCVR) 45 to the voltage of the LED anode side of resistor (R1) 41. The output of receiver 45 is the received data signal 31. The received data signal (DATA) 31 is input to the edge detector 46, which produces an output pulse in response to a transition of the received data signal 31. The edge detector 46 output is input to the one-shot 47, which produces an output pulse with a relatively fixed pulse width. The one-shot 47 is triggered by a rising edge of the signal applied to the input and is enabled to produce a successive pulse after the previous output pulse returns low. A second pulse input to the one-shot 47 while the one-shot 47 output is still high is ignored.

The clock and data recovery circuit shown in FIG. 3 is just one example of many possible circuit architectures. For example, data could be ac-coupled into receiver (RCVR) 45 or the LED 21 anode voltage could be compared to the voltage on VDD 29 if receiver (RCVR) 45 has some built in offset. The clock 30 could be generated from data 31 using a phase locked loop (PLL), a delay locked loop (DLL), or a variety of combinations of edge detectors, one-shots, and delay elements.

Figure 4:
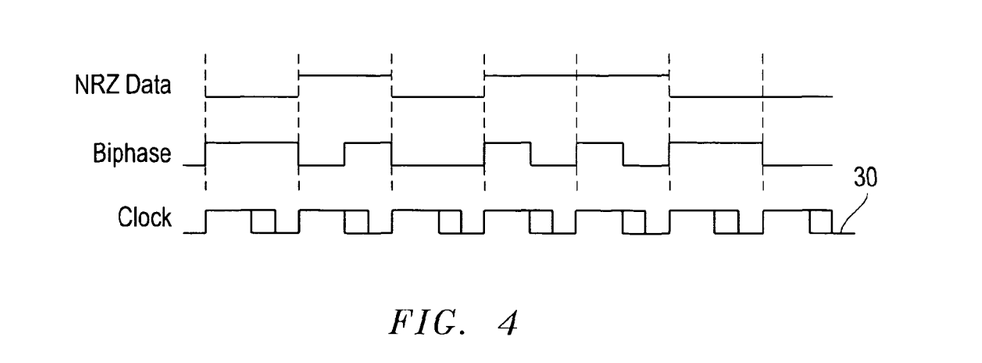
FIG. 4 depicts a timing diagram for the recovered clock and data.

FIG. 4 illustrates a timing diagram for non-return to zero (NRZ) data and the encoded data sent from the reader 11 to the tag 12, and the clock produced at the output of the one-shot 47. Data can be encoded according to a variety of well known encoding schemes, however, this example shows bi-phase encoding, which is an example of an encoding protocol for the optical data that prevents long strings of data without transitions. Other examples of possible coding schemes include 4b5b, 8b10b, Miller coding, and NRZ.

Bi-phase encoding produces a transition between NRZ bits and an additional transition in the middle of an NRZ one. The width of the pulse produced by the one-shot 47 is longer than half an NRZ bit period, which suppresses any pulse produced by the edge detector 46 in the middle of an NRZ bit period. The pulse width of the one-shot 47 output is longer than one half an NRZ bit period and shorter than one NRZ bit period. The duty cycle of the bi-phase coding can be adjusted to reduce the required tolerances on the one-shot 47 pulse width output.

Other examples of timing diagrams for the example circuit shown in FIG. 3 are also possible. The timing diagrams associated with other possible clock and data recovery circuits such as PLLs and DLLs would be different from the example timing diagram shown in FIG. 4 for the example circuit shown in FIG. 3.

Figure 5A:
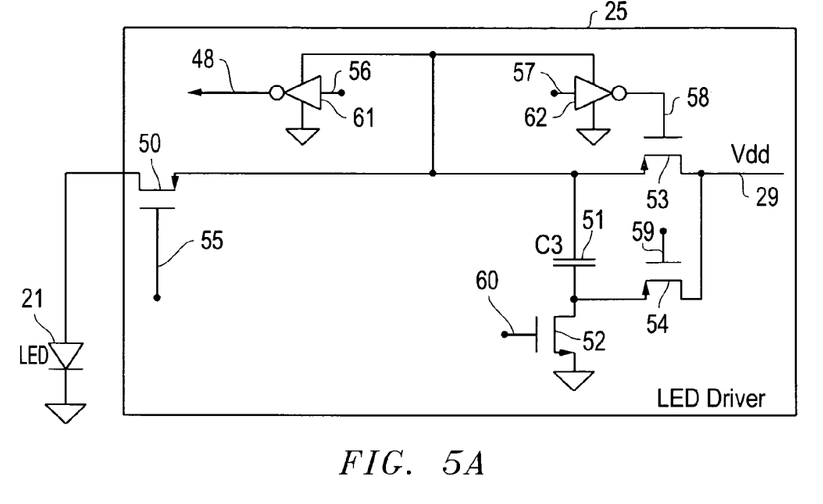
FIG. 5A is a block diagram of an exemplary LED driver circuit.

FIG. 5A illustrates an exemplary LED driver circuit 25, the primary function of which is to produce the high voltage necessary for the LED 21 to emit light. The switches 50, 52, 53, and 54 and the associated control signals 55, 58, 59, and 60 enable capacitor (C3) 51 to be charged to the voltage on the node VDD 29 while receiving data and light, and then be switched in series with the power supply capacitor (C1) 44 to produce roughly twice the voltage of VDD 29.

The switches 50, 53, and 54 are p-channel type and switch 52 is n-channel type. When receiving light (either unmodulated, or modulated to carry data), capacitor (C3) 51 is charging to the voltage on VDD 29. Switches 52 and 53 are conducting and switch 54 is not conducting. The state of switch 50 depends on the protocol timing. It is not conducting while receiving data, but is conducting just prior to and while transmitting a light pulse. When capacitor (C3) 51 is charging, the top plate of the capacitor is connected to VDD 29 through switch 53 and the bottom plate is connected to ground through switch 52.

Once the LED driver 25 capacitor (C3) 51 and the power supply capacitor (C2) 44 are sufficiently charged and the state machine 26 determines that a light pulse should be generated, switches 53 and 52 become non-conductive and switches 50 and 54 become conductive, which results in the voltage applied to the anode of LED 21 being roughly twice the voltage on VDD 29. The logical inverters 61 and 62 are necessary so that the voltage of the output signals 58 and 48 are not lower than the high voltage necessary to enable the LED 21 to emit light. The control signals 55, 56, 57, 59, and 60 are produced by the state machine 26.

Figure 5B:
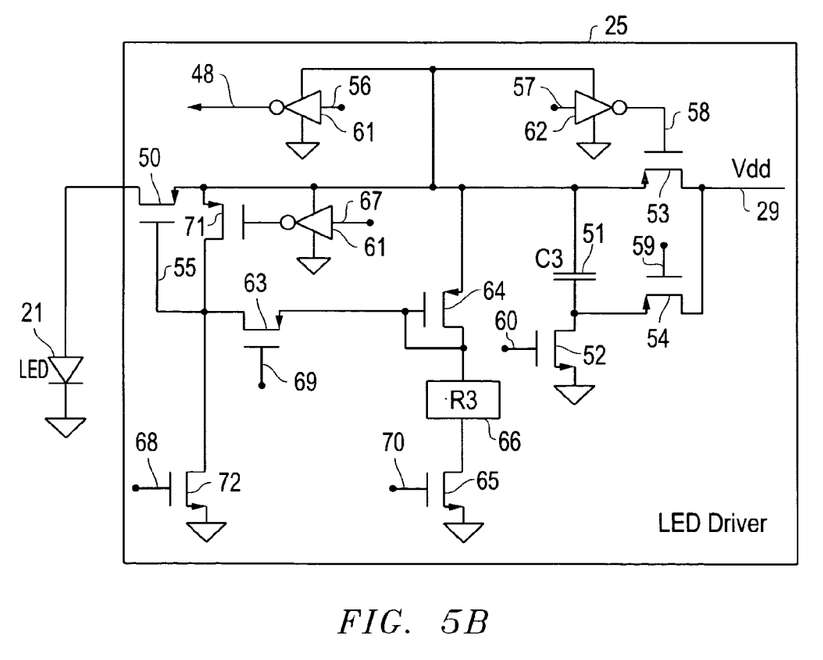
FIG. 5B is a block diagram of another exemplary LED driver circuit.

FIG. 5B illustrates another exemplary LED driver circuit 25 that produces a relatively constant current through LED 21. The voltage on the control signal 55 to the gate of device 50 can be a logical high or low, or can be equal to the gate voltage of device 64. When the tag 12 is producing light from LED 21, devices 65 and 63 are conducting and the current through device 64 is determined by the voltage drop across resistor (R3) 66 divided by the resistance. The voltage drop across resistor (R3) 66 is roughly the voltage on VDD 29 minus the gate to source voltage of device 64. The current through device 64 is mirrored to device 50 by the voltage on control signal 55.

Devices 72 and 71 are not conducting when tag 12 is emitting light. When device 71 is conducting and devices 72 and 63 are not conducting, device 50 is not conducting and the LED driver is disconnected from the LED 21. When device 72 is conducting and devices 71 and 63 are not conducting, device 50 is conducting which connects the LED 21 to the LED driver capacitor (C3) 51.

The example LED driver 25 circuits shown in FIGS. 5A and 5B are just two of many possibilities for self-powered controller IC 22 applications. These circuits use capacitors to boost the voltage on VDD 29 to the level necessary to produce light from the LED 21. Other circuits could use capacitors configured in different ways or could use inductors, for example, to boost the voltage. Applications in which the controller IC 22 is powered locally, no voltage boost may be necessary at all, provided the local power supply provides sufficient voltage.

Figure 6:
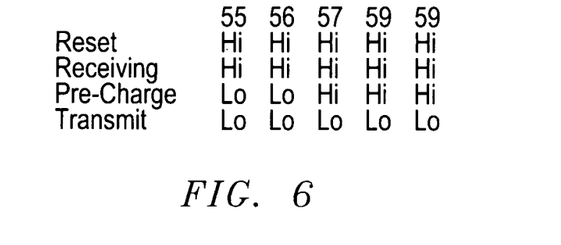
FIG. 6 is a state diagram for controlling the LED driver shown in FIG. 5A.

FIG. 6 illustrates an exemplary state diagram for the state machine 26 controlling the LED driver 25 described in FIG. 5A. When the tag 12 is powering up and the voltage on node VDD 29 is below the reset threshold limit, the signals 55, 56, 57, 59, and 60 from the state machine 26 are all high. Consequently, the power supply filter capacitor (C1) 44 is charging through device 40 and the LED driver 25 capacitor (C3) 51 is charging through device 53. Device 52 is conducting which connects the bottom plate of capacitor (C3) 51 to ground, and device 54 is not conducting.

When the tag 12 is receiving data, all the LED driver 25 control signals remain in the same state as in the reset state. Capacitors (C1) 44 and (C3) 51 are connected in parallel to create the voltage on node VDD 29 and, in combination with resistor (R1) 41, the power supply filter 23. When receiving data, the controller IC 22 power supply current flows through resistor (R1) 41, which can reduce the voltage on VDD 29 by up to 100 mV relative to the average voltage across the LED 21. To charge capacitors (C1) 44 and (C3) 51 to the full anode voltage instead of the reduced VDD 29 voltage, just prior to transmitting a light pulse, the state machine 26 sets switch 40 to the non-conductive state and switch 50 to the conductive state by setting control signals 55 and 56 low, which bypasses resistor (R1) 41. The state machine also disables the data receiver to minimize current draw from the LED 21 during this driver pre-charge state to minimize droop on VDD 29.

To transmit a light pulse, the state machine 26 sets devices 52 and 53 in the non-conductive state by setting control signals 57 and 60 low. The state machine 26 then sets control signal 59 low, which puts device 54 in the conductive state. The bottom plate of capacitor (C3) 51 is connected to node VDD 29 through device 54 and the voltage of the top plate of the capacitor (C3) 51 is pushed up to roughly twice the voltage on VDD 29. The state diagram in FIG. 6 illustrates the state machine states, but does not show this sequencing of control signal transitions when changing from the pre-charge to transmit states.

During the LED driver pre-charge state, capacitors (C1) 44 and (C3) 51 are charged to a voltage roughly within the range of 0.5 to 1.0 volts for near infrared LEDs. Visible LEDs produce higher voltages. During the transmit state, the voltage applied to the LED 21 is roughly twice the pre-charge value, or roughly 1 to 2 volts. Assuming values of 1 nF for each of the capacitors (C1) 44 and (C3) 51, the effective capacitance of the series combination is 0.5 nF, which can produce 10 mA for 500 nSec, or 100 mA for 50 nSec, through the LED 21 with a resulting voltage drop of roughly 100 mV.

The necessary brightness and duration of the transmitted light pulses from the tag 12 depend on the capabilities of the reader 11. The LED driver circuitry 25 in the tag 12 can be adjusted to produce more light for less time or less light for more time depending on the capabilities of the reader 11. The trade off between time and optical power can be adjusted in the LED driver circuit in FIG. 5A by adjusting the parasitic resistance of switches 50 and 54 or by adding some series resistance between switch 50 and the LED 21. The trade off between time and optical power can be adjusted in the LED driver circuit in FIG. 5B by changing the resistance of resistor (R3) 66.

Figure 7A:
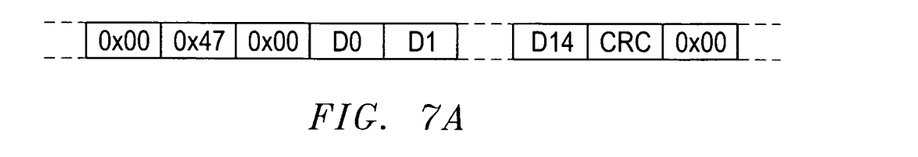
FIGS. 7A and 7B depict timing diagrams for an exemplary write and read communication protocol.
Figure 7B:
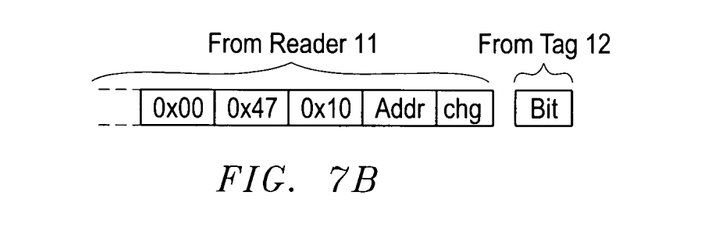

FIG. 7A and FIG. 7B illustrate an exemplary communication protocol for transmitting data between the reader 11 and the tag 12 assuming the size of the tag 12 non-volatile memory 27 is 16 bytes. As shown in FIG. 7A, the protocol to write data to the tag 12 begins with a series of bi-phase encoded zeros to set the DC value of node VDD 29. Assuming values of 100 k ohms for resistor (R1) 41, 1 nF for capacitors (C1) 44 and (C3) 51, and the series of bi-phase zeros preceding the write command, the power supply filter 23 settles to the operating voltage in roughly 1 mSec. Following the start sequence of bi-phase zeros, the reader 11 transmits a unique start code of bi-phase encoded NRZ data 0x47, for example, which synchronizes the tag 12 to the reader 11 and initiates communication. A variety of start codes can be used, but should have sufficient number of zeros and ones to prevent random bit errors from looking like a start code.

Following the unique start code 0x47 is a command byte that specifies reading or writing, with NRZ 0x00 specifying a write command and 0x10 specifying a read command. For a write command, data to be written to non-volatile memory 27 follows including an error detection checksum (CRC). Assuming 16 bytes of non-volatile memory 27, the write command includes 15 bytes of data and one byte of checksum, which produces 16 bytes of data that are to be written to memory 27. The state machine 26 in the controller IC 22 generates a checksum internally from the first 15 bytes received and compares the internally generated checksum to the $16^{th}$ byte received. If both checksums match, the controller IC 22 writes all 16 bytes to memory 27.

The non-volatile memory 27 can be implemented with a variety of well known technologies, which typically utilizes a charge pump circuit to produce a high voltage to enable programming of one or more data bits. The write protocol from FIG. 7A shows a sequence of bi-phase encoded zeros following the checksum byte (CRC) that enables the controller IC 22 to successively charge capacitors associated with the memory 27 (i.e., within such charge pump circuits) that are necessary to program the contents of the entire memory. The sequence of bi-phase zeros continues as necessary to complete the programming operation, which when concluded, the memory 27 contains 15 bytes of data and one byte of checksum.

FIG. 7B illustrates an exemplary protocol to read data from the tag 12 to the reader 11. As with writing, the read command is preceded by a series of bi-phase coded zeros to stabilize the power supply filter 23. The read command begins with the unique bi-phase coded start code 0x47 followed the bi-phase coded NRZ value 0x10, which identifies a read operation. Following the 0x10 read code is the address (ADDR) of the bit to be read. Assuming 16 bytes of memory 27, 7 bits of address is sufficient to address every bit in the memory. With more memory, additional address bits will be necessary. The 7 address bits are located within an 8 bit address byte. Following the address byte is a time period (CHG) when the reader 11 transmits maximum optical power and the tag 11 pre-charges the LED driver and power supply capacitors (C1) 44 and (C3) 51 to the maximum possible voltage. Following the pre-charge state, either a light pulse is generated or not by the tag 12 (BIT) depending on the state of the memory location addressed.

During a read operation, the reader 11 addresses each bit individually until the entire memory contents have been read. The reader 11 generates a checksum (CRC) over the first 15 bytes read and compares the result to the last byte read from the tag 12. If the generated checksum and the contents of the last byte read match, then the first 15 bytes read are deemed correct.

When the tag 12 produces a pulse of light, the series connected capacitors (C3) 51 and (C1) 44 are discharged. After producing a light pulse, the resulting voltage across capacitor (C1) 44 (which also provides the power supply voltage VDD 29 for the state machine 26) depends on the initial voltage across capacitor (C1) 44 and the time during which the LED driver circuit 25 is active for a given current setting. The protocol illustrated in FIG. 7B allows the resulting voltage across capacitor (C1) 44 to drop below the voltage necessary for reliable state machine 26 operation, which enables the maximum amount of charge to be converted to light. After transmission of a data bit, the state machine 26 is either reset by the reset generator 28 or by a timeout circuit in the state machine 26.

Figure 8A:
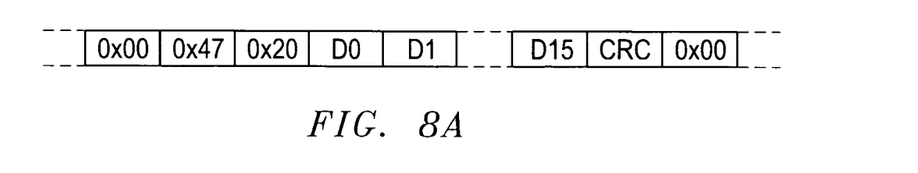
FIGS. 8A and 8B depict timing diagrams for another exemplary write and read communication protocol.
Figure 8B:
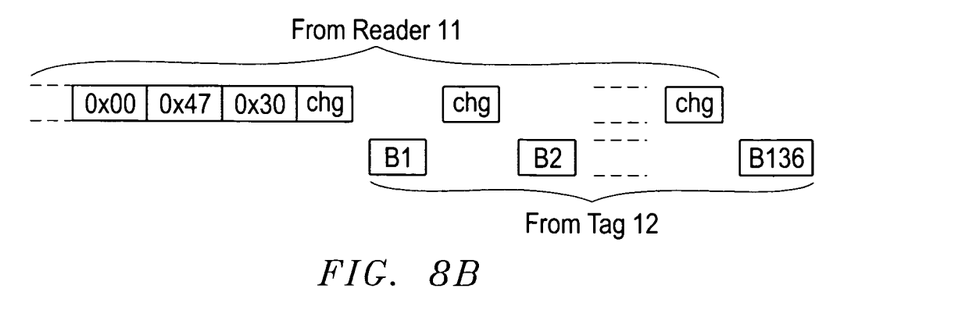

FIG. 8A and FIG. 8B illustrate another exemplary protocol for transmitting data between the reader 11 and the tag 12 assuming the size of the tag 12 non-volatile memory 27 is 16 bytes. This protocol is more efficient in the amount of time necessary for the reader 11 to read data from the tag 12; however, this protocol requires that the LED driver circuit 25 turn off after transmitting a pulse before the capacitor (C1) 44 is discharged below the reliable operating voltage of the state machine 26.

The write protocol shown in FIG. 8A to write data to the tag 12 begins with a series of bi-phase encoded zeros to set the DC value of node VDD 29. Following the start sequence of bi-phase zeros, the reader 11 transmits a unique start code of bi-phase encoded NRZ data 0x47, which synchronizes the tag 12 to the reader 11 and initiates communication. Following the unique start code 0x47 is a command byte that specifies reading or writing, with NRZ 0x20 specifying a write command, and 0x30 specifying a read command. For a write command, data to be written to non-volatile memory 27 follows including an error detection checksum (CRC). Assuming 16 bytes of non-volatile memory 27, the write command includes 16 bytes of data and one byte of checksum. The state machine 26 in the controller IC 22 generates a checksum internally from the first 16 bytes received and compares the internally generated checksum to the 17$^{th}$ byte received. If both checksums match, the controller IC 22 writes the 16 data bytes to memory 27.

FIG. 8B illustrates another exemplary protocol to read data from the tag 12 to the reader 11. As with writing, the read command is preceded by a series of bi-phase coded zeros to stabilize the power supply filter 23. The read command begins with the unique bi-phase coded start code 0x47 followed by the bi-phase coded NRZ value 0x30, which identifies the read operation. Following the 0x30 read code, the controller IC 22 transmits every bit (B1, B2 . . . B136) from the memory 27 sequentially followed by an 8 bit checksum, which is generated within the state machine 26. Prior to each bit being transmitted, a time is provided to pre-charge (CHG) the capacitors (C1) 44 and (C3) 51.

The time required to pre-charge the capacitors depends on the received light power. Assuming the LED produces 1 uA of current at the sensitivity limit, the capacitance of (C1) 44 and (C3) 51 is 1 nf each, and the voltage change on (C1) 44 and (C3) 51 is 200 mV, the time to pre-charge is roughly 400 usec. During this charge time all DC current paths on the controller IC are turned off and the state machine waits for a light off transition from the reader 11 to initiate transmitting the next bit. Delay elements based on RC time constants associated with the state machine produce a short time between the end of the pre-charge time and the beginning of a transmitted bit. The transmission time can be configured to produce a relatively bright light pulse for a short period of time or less light for a longer period of time. If the reader 11 detects a light pulse during this time, the data from the tag 12 is a logical one. If the reader 11 does not detect a light pulse during this time, the data from the tag 11 is a logical zero.

During a read operation, the reader 11 reads the entire memory 27 in with one command. Both the reader 11 and the tag 12 generate a checksum from the 16 bytes of data from memory 27. The checksum from the tag 12 is read by the reader 11 as the 17$^{th}$ byte of data. If the generated checksum and the contents of this last byte read match, then the first 16 bytes read are deemed correct.

The protocols shown in FIGS. 7A, 7B, 8A and 8B are examples of a wide range of possible protocols for communicating data between the reader 11 and the tag 12. Industry standard protocols, such as used for RFID devices or even IRDA, may be used directly or with some modification, or completely new protocols could be developed. The protocols from FIGS. 7A, 7B, 8A and 8B show the self-powered tag 12 transmitting a maximum of one light pulse between re-charge times, however, multiple pulses or even pulses with multiple optical power levels may be implemented.

FIGS. 1-8 illustrate examples of detailed implementations for identification and data tag applications. For self-powered remote sensor and other applications, the controller IC 22 may be very similar. For remote sensors, the controller IC 22 may additionally contain some sort of sensor and digitizer. For example for remote temperature sensors, the controller IC 22 may be powered by sunlight through the LED 21, measure the voltage across a diode and store the results in non-volatile memory. At a later time a reader 11 could read the stored samples just like from the data tag 12. In another example, the controller IC may have more intelligence and store results only if certain conditions are met. This reduces the amount of memory needed on the controller IC. Other examples of remote sensors include pressure, humidity, acceleration, and chemical among others.

Another exemplary remote sensor does not store any results in the controller IC 22. A reader 11 could shine a focused light beam at the sensor to energize and write commands to the tag 12. The tag 12 could then digitize the sensor value and communicate the results back to the reader 11.

Another exemplary remote sensor may include a re-chargeable battery. The device could be powered and the battery charged by ambient or sun light. The battery could provide power during times of low light. The sensor could operate in a read only mode by continually transmitting optical data while powered, or could respond to a reader. A reader could issue optical read or write commands by producing modulated light intensity substantially higher than ambient light.

In a sensor, an identification, or data tag with an attached re-chargeable battery, the architecture of the controller IC 22 may vary from the tag 12 described in FIGS. 1-8. For example, the battery voltage could be sufficient to emit light from the LED 21 without any voltage boost. As another example, the charge stored on the battery could be sufficient to enable the optical communication device to transmit long strings of data without being re-charged. As another example, the clock and data recovery circuit could be a PLL.

In all these sensor, and identification and data tag examples and applications, however, the LED 21 converts incident light to electrical power for the controller IC and converts electronic data to optical data for a reader. In some of these examples, the incident light is modulated with data that is detected by the controller IC 22.

The controller IC 22 for locally powered optical communication devices using one LED 21 for transmitting and receiving could also be substantially different from that of an identification or data tag, or a remote sensor. An example of a simple controller IC 22 could comprise just an LED driver 25 and receiver 45. The optical data received by the device could be forwarded electrically to a network interface controller and electrical data from the network interface controller could be forwarded to the device and communicated optically to another device. An example of a more intelligent controller IC 22 includes an LED driver 25, clock and data recovery 24, and the complete network interface controller functionality. In all these locally powered optical communication device examples, the LED 21 is used for both transmitting and receiving optical data.

The foregoing detailed description has described only a few of the many possible implementations of the present invention. For this reason, this detailed description is intended by way of illustration, and not by way of limitations. Numerous variations and modifications will become apparent to those skilled in the art once the above disclosure is fully appreciated, without departing from the scope and spirit of the invention. It is intended that the following claims be interpreted to embrace all such variations and modifications. It is only the following claims, including all equivalents, that are intended to define the scope of this invention. Moreover, the inventive aspects of the embodiments described above are specifically contemplated to be used alone as well as in various combinations. Accordingly, other embodiments, variations, and improvements not described herein are not necessarily excluded from the scope of the invention.

What is claimed is:

1. A communication device, comprising:
a light emitting diode ("LED") configurable for both receiving and emitting light; and
circuitry coupled to the LED and configured to transmit and receive optical data using the LED, wherein the circuitry comprises voltage boost circuitry configured to boost a voltage generated by the LED upon receiving light to produce a higher voltage than generated by the LED from the received light.

2. The communication device of claim 1, wherein the circuitry is configured to transmit and receive the optical data at different times to provide bi-directional communication over a common medium.

3. The communication device of claim 2, wherein the medium is entirely air.

4. The communication device of claim 2, wherein the medium is an optical fiber.

5. The communication device of claim 2, wherein the circuitry is further configured to receive optical data modulated between two different optical power levels.

6. The communication device of claim 5, wherein the circuitry is configured to receive optical data encoded to prevent long strings of optical data without transitions.

7. The communication device of claim 6, wherein the received optical data is bi-phase encoded.

8. The communication device of claim 7, wherein the circuitry comprises a one-shot configured to provide a receive clock as an output.

9. The communication device of claim 7, wherein the circuitry comprises a phase locked loop, the phase lock loop being utilized to provide a receive clock.

10. The communication device of claim 2, wherein each bit of transmitted optical data is represented by a presence or an absence of a light pulse.

11. The communication device of claim 1, wherein the circuitry comprises a controller integrated circuit.

12. The communication device of claim 1, wherein the circuitry comprises memory circuitry configured to store data.

13. The communication device of claim 12, wherein the memory circuitry comprises programmable memory circuitry configured to store data representing optical data received by the communication device.

14. The communication device of claim 12, wherein the data comprises identification information.

15. The communication device of claim 1, wherein the voltage boost circuitry comprises two capacitors configured to be charged by the LED in a parallel configuration and to drive the LED in a series configuration.

16. A communication device, comprising:
a light emitting diode ("LED") configurable for both emitting light and receiving light; and
circuitry configured to generate power for the communication device from incident light on the LED and to transmit optical data from the communication device using the LED, wherein the circuitry comprises voltage boost circuitry configured to boost a voltage generated by the LED upon receiving the incident light to produce a higher voltage than generated by the LED from the incident light.

17. The communication device of claim 16, wherein the incident light comprises modulated optical data.

18. The communication device of claim 16, wherein the incident light comprises ambient light.

19. The communication device of claim 18, wherein the circuitry is configured to transmit optical data at periodic intervals.

20. The communication device of claim 19, further comprising a sensor having output signals, the optical data representing output signals from the sensor.

21. The communication device of claim 16, wherein the circuitry comprises a one-shot configured to provide a receive clock as an output.

22. The communication device of claim 16, wherein the voltage boost circuitry comprises two capacitors configured to be charged by the LED in a parallel configuration and to drive the LED in a series configuration.

23. A method, comprising:
- receiving optical data with a communication device wherein said receiving comprises configuring a light emitting diode ("LED") to receive incident light comprising the optical data;
- boosting a voltage generated by the LED upon receiving the incident light to produce a higher voltage than generated by the LED from the incident light; and
- transmitting data from the communication device, wherein said transmitting comprises configuring the same LED to emit light comprising the data, and wherein the same LED is configured to emit light by driving the same LED with the higher voltage.

24. A method, comprising:
- powering a communication device by incident light received via a light emitting diode ("LED");
- boosting a voltage generated by the LED upon receiving the incident light to produce a higher voltage than generated by the LED from the incident light; and
- transmitting data from the communication device using the same LED by driving the same LED with the higher voltage, so that the LED is configured to emit light comprising the data.

* * * * *